United States Patent
Chatterjee et al.

(10) Patent No.: US 11,645,358 B2
(45) Date of Patent: May 9, 2023

(54) GENERATION OF EXECUTABLE FILES CORRESPONDING TO NEURAL NETWORK MODELS

(71) Applicant: HEWLETT PACKARD ENTERPRISE DEVELOPMENT LP, Houston, TX (US)

(72) Inventors: Soumitra Chatterjee, Bangalore (IN); Sunil Vishwanathpur Lakshminarasimha, Bangalore (IN); Mohan Parthasarathy, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 953 days.

(21) Appl. No.: 16/260,331

(22) Filed: Jan. 29, 2019

(65) Prior Publication Data

US 2020/0242189 A1    Jul. 30, 2020

(51) Int. Cl.
*G06F 17/16*    (2006.01)
*G06F 9/44*    (2018.01)
(Continued)

(52) U.S. Cl.
CPC ............... *G06F 17/16* (2013.01); *G06F 8/20* (2013.01); *G06F 9/44* (2013.01); *G06N 3/02* (2013.01); *G06N 3/04* (2013.01); *G06N 3/063* (2013.01)

(58) Field of Classification Search
CPC . G06F 17/16; G06F 17/10; G06F 8/20; G06F 9/44; G06N 3/02; G06N 3/04; G06N 3/063; G06N 3/06
See application file for complete search history.

(56) References Cited

U.S. PATENT DOCUMENTS

2017/0124451 A1*   5/2017   Barham ................. G06N 3/063
2018/0275967 A1    9/2018   Mohamed et al.
(Continued)

OTHER PUBLICATIONS

J. Ambrosi et al., "Hardware-Software Co-Design for an Analog-Digital Accelerator for Machine Learning," 2018 IEEE International Conference on Rebooting Computing (ICRC), 2018, pp. 1-13 (Year: 2018).*

(Continued)

*Primary Examiner* — Ying Yu Chen
*Assistant Examiner* — Brian J Hales
(74) *Attorney, Agent, or Firm* — Trop, Pruner & Hu, P.C.

(57) ABSTRACT

In an example, a neural network program corresponding to a neural network model is received. The neural network program includes matrices, vectors, and matrix-vector multiplication (MVM) operations. A computation graph corresponding to the neural network model is generated. The computation graph includes a plurality of nodes, each node representing a MVM operation, a matrix, or a vector. Further, a class model corresponding to the neural network model is populated with a data structure pointing to the computation graph. The computation graph is traversed based on the class model. Based on the traversal, the plurality of MVM operations are assigned to MVM units of a neural network accelerator. Each MVM unit can perform a MVM operation. Based on assignment of the plurality of MVM operations, an executable file is generated for execution by the neural network accelerator.

14 Claims, 5 Drawing Sheets

(51) Int. Cl.
  *G06F 8/20*   (2018.01)
  *G06N 3/04*   (2006.01)
  *G06N 3/063*  (2006.01)
  *G06N 3/02*   (2006.01)

(56) References Cited

U.S. PATENT DOCUMENTS

| | | | | |
|---|---|---|---|---|
| 2018/0336456 | A1* | 11/2018 | Norrie | G06F 9/30141 |
| 2019/0034785 | A1* | 1/2019 | Murray | G06N 3/0454 |
| 2019/0278574 | A1* | 9/2019 | Ravishankar | G06F 16/9024 |
| 2020/0042856 | A1* | 2/2020 | Datta | G06N 3/063 |

OTHER PUBLICATIONS

Arvind Sujeeth, "OptiML: An Implicitly Parallel Domain-Specific Language for Machine Learning ," 2011, <http://www.icml-2011.org/papers/373_icmlpaper.pdf>.

Leonard Truong, "Latte: a Language, Compiler, and Runtime for Elegant and Efficient Deep Neural Networks," PLDI'16, Jun. 13-17, 2016, <http://www.thev.net/PaulLiu/download/p209-truong.pdf>.

Pedro Bruel, "Generalize or Die: Operating Systems Support for Memristor-based Accelerators,", 2017 <http://impact.crhc.illinois.edu/shared/Papers/dpe-icrc17.pdf >.

Richard Wei, "DLVM: a Modern Compiler Infrastructure for Deep Learning Systems," Feb. 2, 2018, <https://arxiv.org/pdf/1711.03016.pdf>.

"Aruba Networks", Jan. 26, 2019, available online at <https://web.archive.org/web/20190126124141/https://www.arubanetworks.com/>, 4 pages.

"ONNX", available online at <https://web.archive.org/web/20190127192801/http://onnx.ai/>, Jan. 27, 2019, 4 pages.

"YOLO: Real-Time Object Detection", available online at <https://web.archive.org/web/20190124160912/https://pjreddie.com/darknet/yolo/>, Jan. 24, 2019, 10 pages.

Caffe2,"A New Lightweight, Modular, and Scalable Deep Learning Framework", available online at <https://web.archive.org/web/20181225223801/https://caffe2.ai/>, Dec. 25, 2018, 4 pages.

Wikipedia, "Long short-term memory", available online at <https://en.wikipedia.org/w/index.php?title=Long_short-term_memory&oldid=880296696>, Jan. 26, 2019, 10 pages.

Hu et al., "Dot-Product Engine for Neuromorphic Computing: Programming 1T1M Crossbar to Accelerate Matrix-Vector Multiplication", 2016, 7 pages.

John Paul Strachan, "The Dot-Product Engine (DPE): exploring high efficiency analog multiplication with memristor arrays", Dec. 11, 2015, 29 pages.

Microsoft Azure, "The Microsoft Cognitive Toolkit", Jan. 22, 2017, available online at <https://www.microsoft.com/en-us/cognitive-toolkit/>, 2 pages.

Norm Jouppi, "Google supercharges machine learning tasks with TPU custom chip", available online at <https://cloud.google.com/blog/products/gcp/google-supercharges-machine-learning-tasks-with-custom-chip>, May 19, 2016, 4 pages.

SWIG, "Executive Summary", available online at <https://web.archive.org/web/20190115210936/http://swig.org/exec.html>, Jan. 15, 2019, 2 pages.

Tensorflow, "An open source machine learning framework for everyone", available online at <https://web.archive.org/web/20190127220308/https://www.tensorflow.org/>, Jan. 27, 2019, 8 pages.

Wikipedia, "Application-specific integrated circuit", available online at <https://en.wikipedia.org/w/index.php?title=Application-specific_integrated_circuit&oldid=880152508>, Jan. 25, 2019, 6 pages.

Wikipedia, "Convolutional neural network" available online at <https://en.wikipedia.org/w/index.php?title=Convolutional_neural_network&oldid=880634812>, Jan. 28, 2019 ,23 pages.

Wikipedia, "Gated recurrent unit", available online at <https://en.wikipedia.org/w/index.php?title=Gated_recurrent_unit&oldid=878331369>, Jan. 14, 2019, 1 page.

* cited by examiner

GENERATION OF EXECUTABLE FILES CORRESPONDING TO NEURAL NETWORK MODELS

BACKGROUND

Neural network models, also referred to as neural networks or artificial neural networks, are simplified models of the way a human nervous system operates. A neural network model may include several interconnected neurons arranged in a plurality of layers. Neural network models are used to implement pattern recognition and predictive analytics in a variety of applications, such as speech recognition, machine translation, computer vision, healthcare diagnostics, machine learning, and the like.

BRIEF DESCRIPTION OF DRAWINGS

The following detailed description references the figures, wherein.

DETAILED DESCRIPTION

A neural network model may be implemented using a neural network program developed in a programming environment. The neural network model may include a plurality of layers, such as an input layer, one or more hidden layers, and an output layer, each of which may include a plurality of neurons. A neuron may be a basic computing unit of the neural network model, may receive one or more inputs, and may generate an output based on the one or more inputs. The neurons in one layer may be connected to the neurons in the next layer. When the neural network model is executed, say, using a processor (e.g., central processing unit (CPU) or graphics processing unit (GPU)), outputs from neurons of one layer may be received by neurons in an adjacent layer. Based on the inputs received, a neuron in the adjacent layer may generate an output, which may then be propagated to neurons in a next layer, such as a second hidden layer or an output layer.

When a neural network model is executed, several mathematical operations may have to be performed. For instance, an output value from a neuron in a first layer may have to be multiplied with a weight value. Based on a product of the output value and the weight value, a neuron in the second layer may generate an output. Generally, the multiplication of the output values and weight values is expressed in the form of a matrix-vector multiplication, with the output value from the neuron in the first layer expressed as an input vector, and the weight value corresponding to the neuron in the second layer expressed as a weight matrix. Since the neural network model may include several layers and each layer may include several neurons, the performance of the mathematical operations tends to be computationally intensive. Accordingly, a speed of execution of the neural network model depends on the speed at which the mathematical operations are carried out.

To improve the speed of execution of the neural network models, an accelerator may be used to perform several mathematical operations in parallel. An accelerator may be understood to be a specialized hardware that can perform a particular function (in this case, execution of the neural network models) more efficiently compared to a general-purpose processing unit. However, neural network models developed using existing programming environments may not be able to leverage a capability of the accelerator to perform several mathematical operations in parallel.

The present subject matter relates to generation of executable files corresponding to neural network models. With the implementations of the present subject matter, mathematical operations involved in the neural network model can be performed in a faster manner, and a speed of execution of the neural network model can be increased.

In accordance with an example implementation, a programming environment is provided in which a neural network program can be expressed using a domain specific language (DSL). The neural network program corresponds to a neural network model and may include a plurality of matrices, a plurality of vectors, and a plurality of matrix-vector multiplication (MVM) operations. The plurality of matrices, plurality of vectors, and plurality of MVM operations are declared using a matrix class, a vector class, and MVM operation class, respectively, defined by the DSL.

A computation graph corresponding to the neural network model is generated. The computation graph includes a first plurality of nodes. Each of the first plurality of nodes represents a MVM operation, a matrix, or a vector. Further, a class model corresponding to the neural network model is populated with a data structure pointing to the computation graph. For example, the data structure may include pointers that may point to the matrices, vectors, and operands of MVM operations of the neural network model. In an example, the data structure may provide initial handles to the computation graph to facilitate traversal of the computation graph.

Subsequently, the computation graph is traversed based on the class model. For instance, the pointers stored in the class model may be utilized to locate the matrices, vectors, and the MVM operations, i.e., the nodes of the computation graph. Based on the traversal, the plurality of MVM operations may be assigned to MVM units of a neural network accelerator. The MVM units may be, for example, memristor crossbars. The MVM units can perform MVM operations. An executable file corresponding to the neural network model may be generated for execution by the neural network accelerator. The executable file may be generated based on assignment of the plurality of tensors and the plurality of tensor operations to the crossbars.

The present subject matter facilitates execution of neural network models by accelerators that can perform several MVM operations in parallel. For instance, since the DSL defines a matrix class, vector class, and MVM operation, the MVM operations that are to be part of the neural network model can be expressed in a simple manner in the neural network program. Further, the MVM operations expressed in the neural network program can be captured as such in the computation graph. Accordingly, the different MVM operations represented in the computation graph may be assigned to different MVM units of the neural network accelerator, thereby enabling parallel execution of the MVM operations. Further, the provision of a class model and population of the class model with a data structure pointing to the computation graph facilitates efficient traversal of the computation graph by the compiler. For instance, repeated traversals of previsited nodes of the computation graph are avoided by using the class model. Overall, the present subject matter enables efficient and speedy execution of neural network models.

The following description refers to the accompanying drawings. Wherever possible, the same reference numbers are used in the drawings and the following description to refer to the same or similar parts. While several examples are described in the description, modifications, adaptations, and other implementations are possible and are intended to be covered herein.

Figure 1:
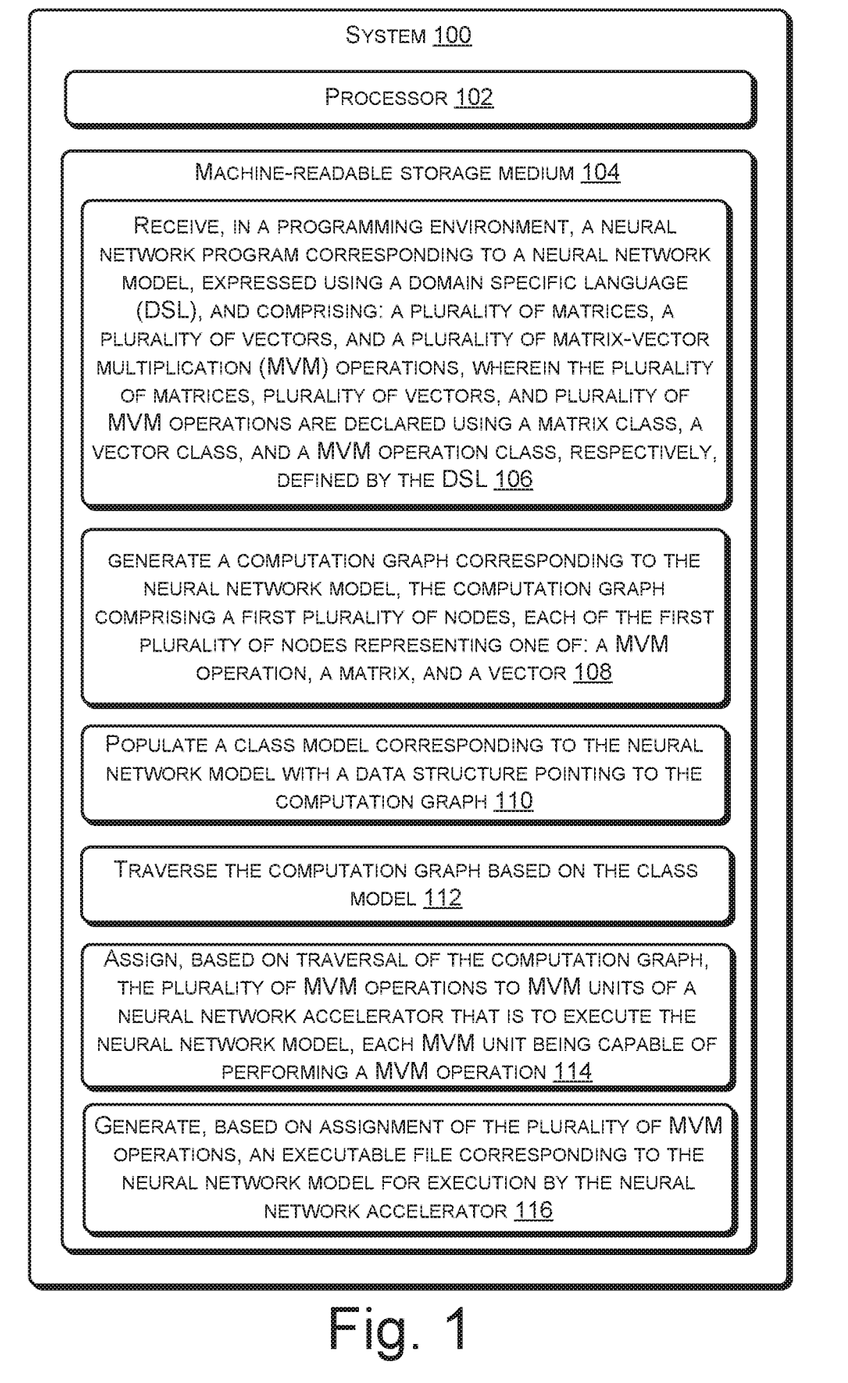
FIG. 1 illustrates a system for generation of executable files corresponding to neural network models, according to an example implementation of the present subject matter.

FIG. 1 illustrates a system 100 for generation of executable files corresponding to neural network models, according to an example implementation of the present subject matter. The system 100 may be implemented as any of a variety of computing systems, such as a desktop computer, a laptop computer, a server, and the like. The system 100 includes a processor 102 and a machine-readable storage medium 104 coupled to the processor 102.

The processor 102 may be implemented as microprocessors, microcomputers, microcontrollers, digital signal processors, central processing units, state machines, logic circuitries, and/or any devices that manipulate signals based on operational instructions. Among other capabilities, the processor 102 may fetch and execute computer-readable instructions included in the machine-readable storage medium 104. The computer-readable instructions, hereinafter referred to as instructions, includes instructions 106, instructions 108, instructions 110, instructions 112, instructions 114, and instructions 116. The functions of the processor 102 may be provided through the use of dedicated hardware as well as hardware capable of executing machine readable instructions.

The machine-readable storage medium 104 may include any non-transitory computer-readable medium including volatile memory (e.g., RAM), and/or non-volatile memory (e.g., EPROM, flash memory, Memnstor, etc.). The machine-readable storage medium 104 may also be an external memory unit, such as a flash drive, a compact disk drive, an external hard disk drive, or the like.

In addition to the processor 102 and the machine-readable storage medium 104, the system 100 may also include interface(s) and system data (not shown in FIG. 1). The interface(s) may include a variety of machine readable instructions-based interfaces and hardware interfaces that allow interaction with a user and with other communication and computing devices, such as network entities, web servers, and external repositories, and peripheral devices. The system data may serve as a repository for storing data that may be fetched, processed, received, or created by the instructions.

In operation, when executed by the processor 102, the instructions 106 enable receiving a neural network program corresponding to a neural network model in a programming environment. The neural network program may be expressed using a domain specific language (DSL) and may include a plurality of matrices, a plurality of vectors, and a plurality of matrix-vector multiplication (MVM) operations. The neural network program may be developed by a developer in the programming environment using the DSL.

The plurality of matrices may be declared using a matrix class defined by the DSL. Similarly, the plurality of vectors and the plurality of MVM operations may be declared using a vector class and a MVM operation class, respectively, defined by the DSL. The DSL will be explained in greater detail with reference to FIG. 2.

The instructions 108, when executed by the processor 102, enable generating a computation graph corresponding to the neural network model. The computation graph includes a first plurality of nodes. Each node of the first plurality of nodes represents one of a MVM operation, a matrix, and a vector of the neural network model. The instructions 110, when executed by the processor 102, enable populating a class model corresponding to the neural network model with a data structure pointing to the computation graph.

Subsequently, the instructions 112, when executed by the processor 102, enable traversing the computation graph based on the class model. Based on traversal of the computation graph, the instructions 114 enable assignment of the plurality of MVM operations to MVM units of a neural network accelerator that is to execute the neural network model. The assignment of the MVM operations to MVM units will be explained with reference to FIG. 3. Each MVM unit of the neural network accelerator is capable of performing a MVM operation. Based on assignment of the plurality of MVM operations, the instructions 116 enable generating an executable file for execution by the neural network accelerator. The executable file corresponds to the neural network model. The executable file may then be provided to the neural network accelerator for execution.

The instructions 112-116, which are performed to generate the executable file, may be performed by a compiler corresponding to the neural network accelerator. The instructions 112-116 may be performed by invoking the compiler corresponding to the neural network accelerator, as will be explained with reference to FIG. 2. In an example, the invocation of the compiler corresponding to the neural network accelerator may be performed during execution of the neural network program, i.e., at program runtime.

Figure 2:
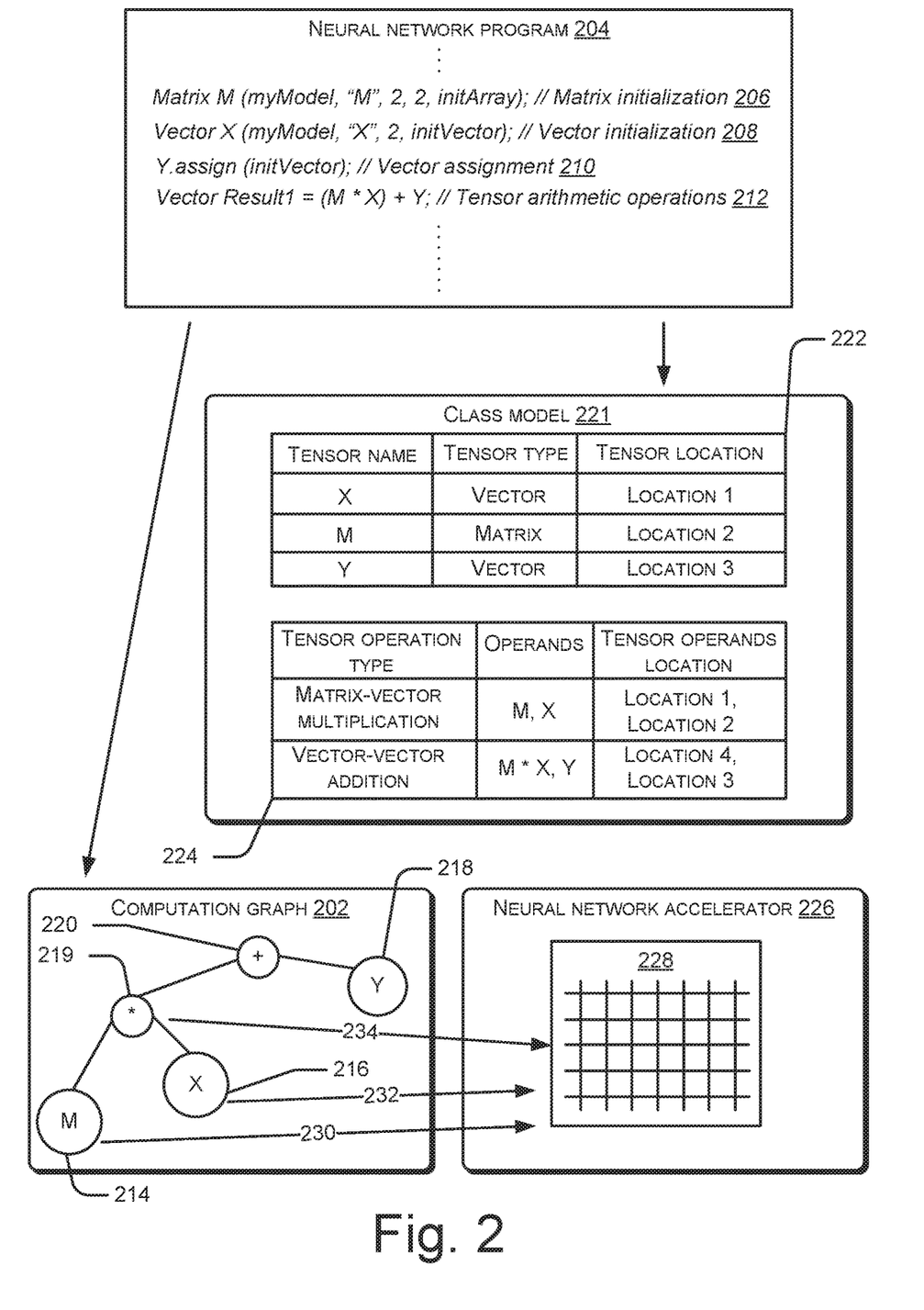
FIG. 2 illustrates generating of a computation graph corresponding to a neural network model, according to an example implementation of the present subject matter.

FIG. 2 illustrates generation of a computation graph 202 corresponding to a neural network model from a neural network program 204, according to an example implementation of the present subject matter. As mentioned earlier, the neural network program 204 may be expressed using a DSL. The DSL may be based on a well-known programing language. In an example, the DSL may be C++ standardized by International Organization for Standardization (ISO), also referred to as ISO C++. Accordingly, the DSL may be referred to as being based on C++. If the DSL is based on C++, the DSL can leverage the standard library of C++.

The DSL may define a matrix class for a matrix having a plurality of rows and a plurality of columns and a vector class for a matrix having a single row or a single column. Using the matrix class, objects of the matrix class, i.e., matrices can be created in the neural network program 204. Accordingly, a programmer developing the neural network program 204 using the DSL may declare matrices in the neural network program 204. For instance, as illustrated by line 206 of the neural network program 204, a matrix 'M' of dimension 2×2 may be initialized. In addition to the matrix class, the DSL may define other classes frequently used in neural network programs. For example, the DSL may define a vector class and a scalar class as well. Using the vector class, vectors may be declared. For example, a vector 'X' having 2 columns may be initialized and a vector 'Y' may be assigned, as illustrated by line 208 and line 210, respectively. In an example, the matrix M may be a weight matrix including weight values for a first neuron in a first layer of the neural network model and the vector X may include output values from a neuron in a layer that acts as an input layer to the first layer. Accordingly, the vector X may be referred to as an input vector. Further, the vector Y may be a bias vector corresponding to the first neuron of the first layer. The matrices, vectors, and scalars may be generally referred to as tensors. In an example, the DSL enables initialization of elements of the tensors in floating format. Thus, the DSL is optimized for declaring tensors that have elements with floating point values.

In addition to the tensors, in the DSL, classes corresponding to mathematical operations that are frequently used in the neural network program may also be defined. For example, a MVM class corresponding to an MVM operation, which involves multiplication of a matrix and a vector, may be defined in the DSL. Further, classes corresponding to other operations that can be used in the neural network program 204, such as matrix-matrix multiplication (MMM), vector-vector addition (VVA), vector-scalar addition (VSA), scalar-scalar addition (SSA), hyperbolic tangent (tan h) of a vector, and the like, may also be defined in the DSL. The DSL may also define classes corresponding to other functions, such as sigmoid, log, exponent, tensor slicing, vector concatenation, and the like. The mathematical operations involving tensors, such as a matrix, vector, or scalar may be referred to as tensor operations. Accordingly, classes corresponding to such mathematical operations may be referred to as tensor operation classes. Using the tensor operation classes, various tensor operations can be declared in the neural network program 204. For example, a MVM operation can be declared using the MVM operation class and a VVA operation can be declared using a VVA operation class.

In an example, the tensor operation classes may be defined with the help of an operator overloading functionality, using which a predefined operator can be provided with a custom meaning for performing operation over custom-defined data types. For example, '*' operator, which may be typically used for performing multiplications of integers, may be used for defining a MVM class. Accordingly, the MVM operation can be declared in the neural network program 204 using the '*' operator.

As mentioned above, using the tensor operation classes defined in the DSL, mathematical operations involved in the neural network model may be expressed. For instance, as illustrated by line 212, a MVM operation involving the matrix M and vector X (M*X) and a VVA operation involving the M*X and Y (M*X+Y) may be expressed. In accordance with the example where M is a weight matrix and X is an input vector, the MVM operation M*X represents the dot product of M and X.

In addition to the tensor classes and the tensor operation classes, the DSL may also define a class which may be used to instantiate an object that corresponds to the entire neural network. Such a class is referred to as a model class and the object instantiated is referred to as a class model, as will be explained in greater detail later.

In an example, upon completion of development of the neural network program 204 in the programming environment using the DSL, the neural network program 204 may be compiled in run-time. Thus, the developer may provide an instruction to execute the neural network program 204. In response to the instruction, the execution of the neural network program 204 may commence in a host in which the programming environment is running, i.e., the system 100. The execution may include compilation of the neural network program 204 by a compiler corresponding to an operating system of the system 100, hereinafter referred to as host compiler. The host compiler may create a file that can be executed by the system 100, hereinafter referred to as host-executable file. The execution of the neural network program 204 includes execution of the host-executable file.

When the host-executable file is executed, objects declared in the neural network program 204, such as the matrix M, vector X, vector Y, and MVM operation M*X get allocated and constructed. The construction of the objects may be performed by constructors corresponding to classes of the objects. For instance, a constructor corresponding to the matrix class may construct the matrix M, a constructor corresponding to the vector class may construct the vector X and vector Y, and a constructor corresponding to the MVM operation class may construct the MVM operation M*X. In an example, each object may get constructed as a node of the computation graph 202. Therefore, the construction of the objects by the constructors causes generation of the computation graph 202. For instance, the construction of the matrix object M causes generation of a matrix node 214 corresponding to the matrix object M, the construction of the vector object X causes generation of a vector node 216 corresponding to the vector object X, the construction of the vector object Y causes generation of a vector node 218 corresponding to the vector object Y, and the construction of the MVM operation object '*' corresponding to the MVM operation M*X causes generation of the MVM node 219. In an example, a node corresponding to any one of a matrix, a vector, and a MVM operation may be referred to as being part of a first plurality of nodes. Accordingly, the matrix node 214, vector node 216, and MVM node 219 are part of the first plurality of nodes.

As mentioned earlier, in addition to matrices and vectors, the neural network model may include other types of tensors, such as scalars. Further, in addition to MVM operations, the neural network model may include other types of tensor operations, such as MMM operation, VVA operation, VSA operation, and SSA operation. The nodes representing tensors other than the matrices and vectors and corresponding to tensor operations other than MVM operations may be referred to as a second plurality of nodes. Accordingly, a VVA operation node 220 may be referred to as one of the second plurality of nodes. Further, although not shown in FIG. 2, the computation graph 202 may include nodes representing operations other than tensor operations, such as sigmoid, log, exponent, tensor slicing, and vector concatenation operations.

In an example, in addition to constructing the nodes of the computation graph 202, the constructors may facilitate population of an object corresponding to the neural network model. An object corresponding to the entire neural network model may be provisioned for the neural network model during execution of the neural network program 204. The object corresponding to the neural network model may be an instance of a class referred to as a model class. Further, the object of the model class may be referred to as model object 221 or a class model 221.

In an example, the instantiation of class model 221, from the model class, may be performed by populating the class model 221 with a data structure having details of the tensors and the tensor operations that are present in the neural network model. The population of the class model, in turn, may be performed by the constructors that construct the tensor objects and the tensor operation objects. For instance, a constructor constructing an object may also populate the class model with a pointer to the object so constructed. For example, a constructor of the matrix object, upon encountering the matrix M in the neural network program 204, records the matrix M and populates the class model 221 with pointers to the location of the matrix M. Similarly, a constructor of the vector object, upon encountering the vector X in the neural network program 204, records the vector X and populates the class model 221 with pointer to the location of the vector X. Further, a constructor of the MVM operation (*), upon encountering the MVM operation M*X, populates the class model 221 with pointers to record the new MVM operation and locations of the operands of the MVM operation, i.e., of the matrix M and of the vector X. Below code is a snippet of definition of the model class, which is used to instantiate the class model 221:

```
class Model {
        std::unordered_map<const TensorImplementation*,
            TensorAttributes*> symbolTable;
        std::unordered_map<const TensorOperation*,
            OperationAttributes*> operationTable;
};
```

Accordingly, upon population of the class model 221, the class model 221 may include various details regarding the tensors, such as name of the tensor and type of the tensor (whether matrix, vector, or scalar). In addition, the details regarding the tensors may also include pointers to the locations of the tensors of the neural network model, say, in the machine-readable storage medium 104. This is illustrated in FIG. 2. In addition to the details regarding the tensors, the class model 221 may also include details regarding the various operations involving the tensors, such as the type of the tensor operation (whether MVM, VVA, or the like), the operands involved in the tensor operation, and the location of the operands of the tensor operation, as illustrated in FIG. 2.

Since the class model 221 includes locations of the tensors and the tensor operations, the class model 221 may point to the nodes of the computation graph 202, and consequently, to the entire computation graph 202. In an example, when the neural network program 204 is executed, the class model 221 may be populated with a first data structure 222 and a second data structure 224. The first data structure 222 may have the details regarding the tensors and the second data structure 224 may have the details regarding the tensor operations. The class model 221 may be utilized for traversing the computation graph 202, as will be explained later. In addition to the tensors and tensor operations, the class model 221 may include details regarding other operations in the neural network as well.

Subsequent to creation of the computation graph 202 and the class model 221, the system 100 may generate an executable file that can be executed by a neural network accelerator 226, interchangeably referred to as an accelerator 226, which is to execute the neural network model. The executable file that can be executed by the accelerator 226 may be referred to as an accelerator-executable file. The accelerator 226 may be capable of performing several tensor operations involved in the neural network model in parallel. For instance, the accelerator 226 can perform several MVM operations at the same time. For this, the accelerator 226 includes a plurality of MVM units, each of which can perform an MVM operation independently of and at the same time as the other MVM units of the accelerator 226. One such MVM unit is represented by the reference numeral 228. In addition to the MVM units, the accelerator 226 may include other units for performing other types of mathematical operations involved in the neural network model.

To leverage the capability of the accelerator 226 to perform several MVM operations and other mathematical operations in parallel, the system 100 may generate the accelerator-executable file such that the accelerator 226 can perform several tensor operations in parallel. To generate the accelerator-executable file, the system 100 may utilize a compiler corresponding to the accelerator 226. The compiler corresponding to the accelerator may be interchangeably referred to as an accelerator compiler. The accelerator compiler may be invoked while the neural network program 204 is being executed, i.e., at program runtime. For this, an Application Programming Interface (API) corresponding to the accelerator compiler may be utilized in the neural network program 204. For example, the neural network program 204 may include the below line of code to invoke the accelerator compiler:
myModel->compile ( );

In an example, in the neural network program 204, the code to invoke the accelerator compiler may be provided below the code corresponding to initialization and assignment of tensors, code corresponding to the tensor operations, and the like. Therefore, during execution of the host-executable file by the system 100, the code corresponding to initialization and assignment of tensors and code corresponding to the tensor operations are executed before executing the code to invoke the accelerator compiler. Accordingly, prior to invocation of the accelerator compiler, the computation graph 202 and the class model 221 are generated.

In an example, the accelerator compiler may utilize the class model 221 as an input to generate the accelerator-executable file. Since the class model 221 points to various nodes in the computation graph 202, the accelerator compiler may traverse the computation graph 202 using the class model 221. In an example, the first data structure 222 and the second data structure 224 of the class model 221 may provide initial handles to the computation graph 202 to facilitate traversal of the computation graph. Since the computation graph 202 includes the various tensors and tensor operations, by traversing the computation graph 202, the accelerator compiler may determine assignment of tensors and tensor operations to various units of the accelerator 226. For example, as mentioned earlier, the accelerator 226 includes a plurality of MVM units, each of which can perform a MVM operation involved in the neural network model. Accordingly, upon traversing the computation graph 202, the accelerator compiler may assign a MVM operation to a MVM unit of the accelerator 226. A MVM operation may be assigned to a MVM unit by assigning a matrix involved in the MVM operation and a vector involved in the MVM operation to the MVM unit. This is illustrated by arrows 230 and 232, which indicate assignment of the matrix M and the vector X, respectively, to the MVM unit 228. Further, the assignment of the MVM operation M*X to the MVM unit 228 is illustrated by the arrow 234. The details regarding assignment of tensors and tensor operations of units of the accelerator 226 will be explained in greater detail with reference to FIG. 3.

The accelerator-executable file generated by the accelerator compiler includes information of the assignment of the tensors and tensor operations to the units of the accelerator 226. Accordingly, when the accelerator-executable file is executed by the accelerator 226, the tensors and the tensor operations are assigned to the units of the accelerator 226 based on the assignment performed by the accelerator compiler. In an example, the accelerator-executable file is in an Executable and Linkable Format (ELF format), which is a standard format for executable files. Accordingly, the accelerator-executable file can be ported to any host, from the system 100. Further, the usage of the ELF format allows the debug of the accelerator-executable file using a wide range of tools. Further, in an example, in addition to the accelerator-executable file, the accelerator compiler may also generate an assembly listing of the accelerator-executable file. Such an assembly listing may be in a human-readable format, facilitating easier debugging.

Figure 3:
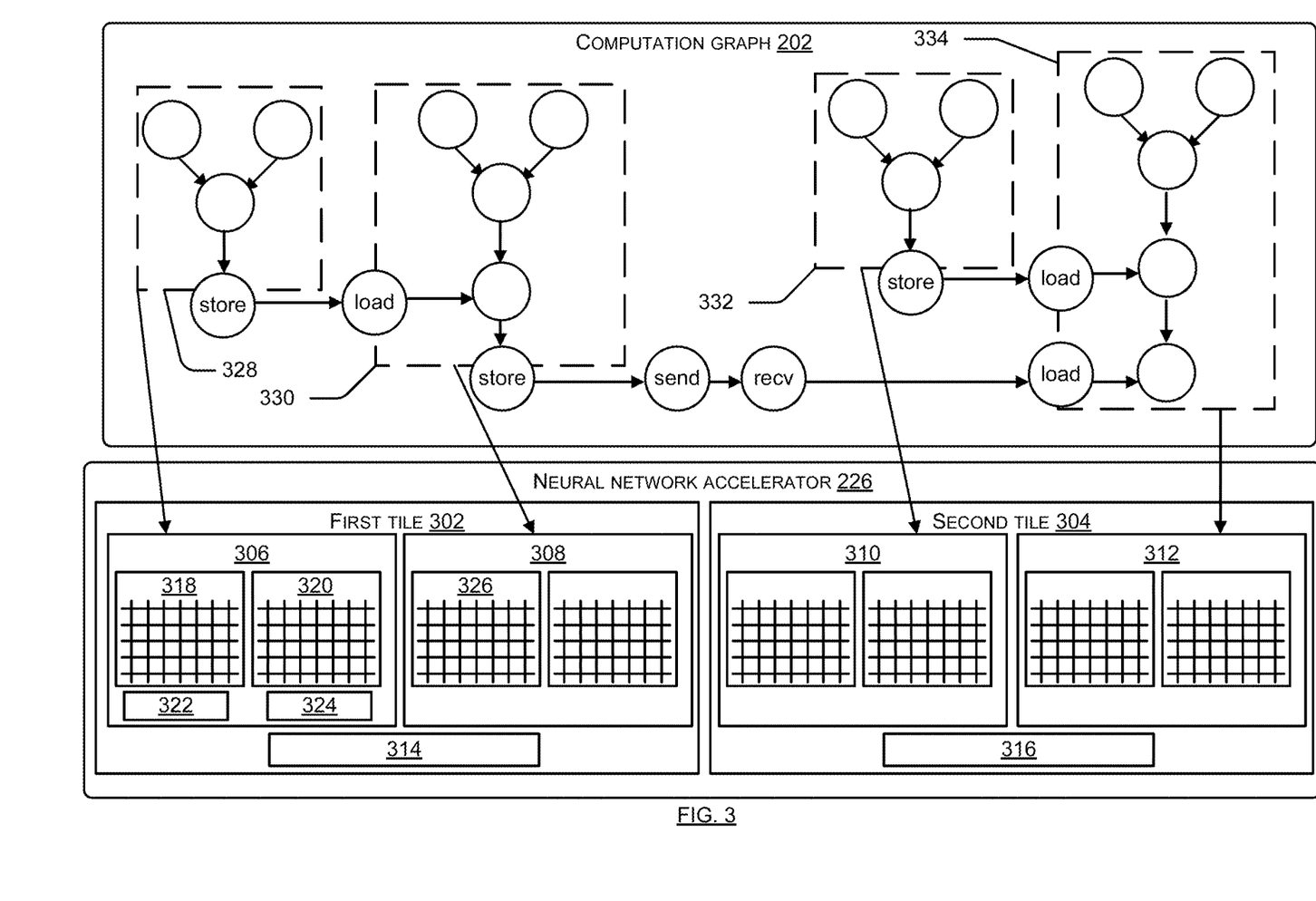
FIG. 3 illustrates assignment of tensors and tensor operations in a computation graph to cores of a neural network accelerator, according to an example implementation of the present subject matter.

FIG. 3 illustrates the assignment of tensors and tensor operations in the computation graph 202 to cores of the accelerator 226, according to an example implementation of the present subject matter. In an example, the accelerator 226 may be part of the system 100. For instance, the system 100 may include a host device that generates the accelerator-executable file and the accelerator 226.

The accelerator 226 may include a plurality of tiles, such as a first tile 302 and a second tile 304. In addition to the plurality of tiles, the accelerator 226 may include a control unit and an input/output (I/O) interface (not shown in FIG. 3). Each tile may include a plurality of cores. For example, the first tile 302 may include a first core 306 and a second core 308. Further, the second tile 304 may include a third core 310 and a fourth core 312. In addition to the plurality of cores, a tile may include other functional units as well. For example, a tile may include a memory, such as a first memory 314 of the first tile 302 and a second memory 316 of the second tile 304. Further, in an example, a tile may include a control unit to perform various control functions, a sigmoid unit to perform a sigmoid operation, an input register, an output register (not shown in FIG. 3), and the like. Each core may include a plurality of MVM units. For example, the first core 306 may include a first MVM unit 318 and a second MVM unit 320. In addition to the MVM units, each core may include units that can perform other tensor computations. For example, each core may include units (not shown in FIG. 3) that can perform vector-vector addition (VVA) operation ("VVA unit"), scalar-scalar addition (SSA) operation ("SSA unit"), matrix-matrix addition (MMA) operation ("MMA unit") of the neural network model. Further, each core may include an arithmetic logic unit (ALU), such as an ALU 322, and a register, such as a register 324.

In an example, a MVM unit may include a plurality of memristors. A memristor is a two-terminal device whose resistance can be reversibly changed by applying a voltage across its terminals. Such a change in resistance is non-volatile, and can be persisted over a long period of time even after the voltage is removed. Accordingly, the memristor may be considered as a unit of memory. The MVM unit may be implemented in the form of an array, with each cross-point in the array having a memristor. Accordingly, the MVM unit may be referred to as a memristor crossbar.

A memristor may be used to determine a product of a first number and a second number. For this, the first number may be mapped on to a conductance of the memristor and a voltage corresponding to the second number may be supplied to the memristor. Accordingly, a current output by the memristor provides the product of the first number and the second number. Using this principle, the MVM unit may be used to compute a dot product of a matrix and a vector. For this, each element of the matrix may be mapped to a conductance value of a memristor in a cross-point of the MVM unit. Further, a voltage corresponding to each element of the vector may be supplied to rows of the MVM unit.

Therefore, current outputs obtained from the columns of the MVM unit are indicative of the vector that is a result of the MVM operation. Accordingly, using a MVM unit based on memristor crossbar, the result of the MVM operation can be obtained quickly.

In an example, the MVM units of the cores may be used to perform dot product operations involved in the neural network model. For example, a dot product of a weight matrix, such as the matrix M, and an input vector, such as vector X, can be computed using the a MVM unit. Since each MVM unit can operate, i.e., perform a MVM operation independently of the other MVM units of the accelerator 226, the accelerator 226 can perform several MVM operations simultaneously.

To leverage the capability of the accelerator 226 to perform several MVM operations simultaneously, the DSL and the accelerator compiler provide several optimizations. For instance, as explained earlier, the DSL defines a matrix class, vector class, and a MVM operation, enabling formation of a computation graph, such as the computation graph 202, that depicts the MVM operations. Further, when generating the accelerator-executable file, the accelerator compiler may distribute assignment of MVM operations depicted in the computation graph 202 across MVM units, so that the MVM operations can be executed independent of each other, and in parallel. The assignment of the MVM operations are explained below:

The MVM operations assigned to the MVM units may include multiplication of weight matrices and input vectors in the neural network model. Further, the MVM operations may be dot product operations involving the weight matrices. In an example, to assign the MVM operations to the MVM units, the accelerator compiler may first assign weight matrices to the MVM units. The weight matrices may be assigned first because, generally, when the neural network model is used for making inferences (i.e., after training of the neural network model), the values of the weight matrices are maintained constant, i.e., are not changed per inference cycle. In an example, when the size of a weight matrix larger than the size of a MVM unit, i.e., when the weight matrix has more elements than the number of cross-points in the MVM unit, the accelerator compiler may divide the weight matrix into a plurality of sub-matrices and assign each sub-matrix to a MVM unit. The division of the weight matrix based on the sizes of the MVM units enables generating an executable file that is optimized to the accelerator 226.

Subsequent to assignment of a weight matrix to a MVM unit, to assign the MVM operation involving the weight matrix to the MVM unit, the input vector to be multiplied with the weight matrix is assigned to the MVM unit. For example, when the matrix M is assigned to the first MVM unit 318, the input vector X may also be assigned to the first MVM unit 318, thereby enabling the first MVM units 318 to perform the MVM operation M*X.

By assigning an entire MVM operation to a MVM unit, data movements across cores and tiles of the accelerator 226 for performing the MVM operation can be reduced. To appreciate the reduction in the data movements, consider a counter-example in which the matrix M is assigned to the first MVM unit 318, while the input vector X is assigned to the third MVM unit 326 in the second core 308. Accordingly, to perform the MVM operation M*X during execution of the neural network model, the input vector X is to be moved from the second core 308 to the first core 306.

As mentioned earlier, in addition to the MVM units, each core may include other units that can perform other types of tensor computations. Accordingly, the accelerator compiler may assign tensors involved in other types tensor computations in the neural network model to the corresponding units of the cores of the accelerator 226. For example, the accelerator compiler may assign a VVA operation in the neural network model to a VVA unit of a core. The accelerator compiler may assign the other types of tensor computations in the neural network model such that data movement across cores and tiles are minimized. For instance, consider the above example in which a vector obtained as a result of the MVM operation M*X and the vector Y are to be added. The MVM operation M*X may be referred to as a first MVM operation and the addition of the result of the first MVM operation with the vector Y may be referred to as a first VVA operation. Consider also that the first MVM operation is assigned to the first MVM unit 318, which is in the first core 306. Accordingly, the accelerator compiler may assign the first VVA operation to a VVA unit in the first core 306. Therefore, the vector obtained as the result of the first MVM operation is not to be transferred outside of the first core 306.

However, if no VVA unit in the first core 306 is available, for example, due to previous assignments of VVA operations to the VVA units of the first core 306, the accelerator compiler may assign the VVA operation to a VVA unit in another core in the first tile 302, such as the second core 308. The assignment of the VVA operation to another core in the same tile prevents data movement across tiles. However, if no VVA unit in the first tile 302 is available, the accelerator compiler may then assign the VVA operation to another tile.

By prioritizing assignment of related tensor operations to the same core/tile in the above manner, the accelerator compiler reduces the amount of data, such as input vectors or intermediate results (e.g., vector M*X), moved across cores/tiles. Further, while assigning tensor operations to various functional units performing the tensor operations, the accelerator compiler may also eliminate spurious copies of data. For example, if a tensor is copied from the first tile 302 to second tile 304, and then back again from the second tile 304 to the first tile 302 without any changes, the accelerator compiler eliminates such data movements. Still further, the accelerator compiler may assign related MVM operations to MVM units that are present in the same core of the accelerator 226. For example, consider that the result of the first MVM operation is to be added to the result of a second MVM operation. In such a case, the first MVM operation may be assigned to the first MVM unit 318 and the second MVM operation may be assigned to the second MVM unit 320. The reduction in data movements across cores and tiles further quickens the execution of the neural network model by the accelerator 226.

In an example, the accelerator compiler may assign tensor operations to the cores based on a traversal of the computation graph 202, as the computation graph 202 depicts the relations between tensor operations. Based on the traversal and based on the availability of computation units like the MVM units and the VVA units of the cores of the accelerator 226, the accelerator compiler may assign tensor operations depicted in different portions of the computation graph 202 to different cores, as illustrated in FIG. 3. Here, a first portion of the computation graph 202, hereinafter referred to as a first sub-graph 328, is assigned to the first core 306. Accordingly, the tensor operations depicted in the first sub-graph 328 is to be performed by the first core 306. Similarly, a second sub-graph 330 is assigned to the second core 308, a third sub-graph 332 is assigned to the third core 310 and a fourth sub-graph 334 is assigned to the fourth core 312.

The assignment of the tensor operations from the computation graph 202 to the cores of the accelerator 226 may be captured in the accelerator-executable file generated by the accelerator compiler. Accordingly, when the accelerator 226 executes the accelerator-executable file, the tensor operations are assigned to the respective cores.

In an example, subsequent to assignment of the tensor operations depicted in the computation graph 202, to generate the accelerator-executable file, the accelerator compiler converts the computation graph 202 into a sequential stream of instructions. The sequential stream of instructions indicates an order in which the instructions are to be executed by the accelerator 226. The conversion of the computation graph 202 into the sequential stream of instructions may be referred to as linearization. Further, the sequential stream of instructions may be subjected to one or more code optimization techniques, such as dead code elimination, copy elimination, address compaction, constant propagation, and the like. The code optimization techniques prevent redundant data transfers, unused tensors, and unused operations corresponding to the unused tensors in the neural network model. Therefore, the accelerator-executable file generated subsequent to the code optimization techniques enable efficient execution of the neural network model by the accelerator 226.

In an example, during generation of the accelerator-executable file, the accelerator compiler detects which of the plurality of tensors in the neural network model are input tensors and which of the plurality of tensors are output tensors. The accelerator 226 may perform the detection based on a pattern of usage of a tensor in the neural network model. For instance, a tensor may be detected as an input tensor if the tensor is assigned a value that is used in subsequent computations. Similarly, a tensor may be detected as an output tensor if the tensor receives values used in other computations and is not used in subsequent computations. Therefore, a developer developing the neural network program 204 is not to explicitly mark them. Also, in an example, the accelerator compiler may detect tensors that are defined but not subsequently used in the neural network model. Based on such a detection, warnings may be generated, thereby avoiding inadvertent programming errors and reducing spurious memory consumption. In a further example, the accelerator compiler may detect and warn the programmer about tensors that are used in the neural network model with invalid lifetime. For example, when the DSL is a C++-based DSL, the accelerator compiler may warn the programmer about usage of tensors with incorrect scoping that consequently get destroyed as per C++ scoping rules, while still being in use by the neural network model. This helps detect and avoid runtime issues during execution of the neural network model by the accelerator 226 due to access of invalid memory locations. The detection of various types of errors as explained in this paragraph ensures that the accelerator-executable file generated is free of the errors. This, in turn, facilitates an error-free and robust execution of the neural network model by the accelerator 226.

Figure 4:
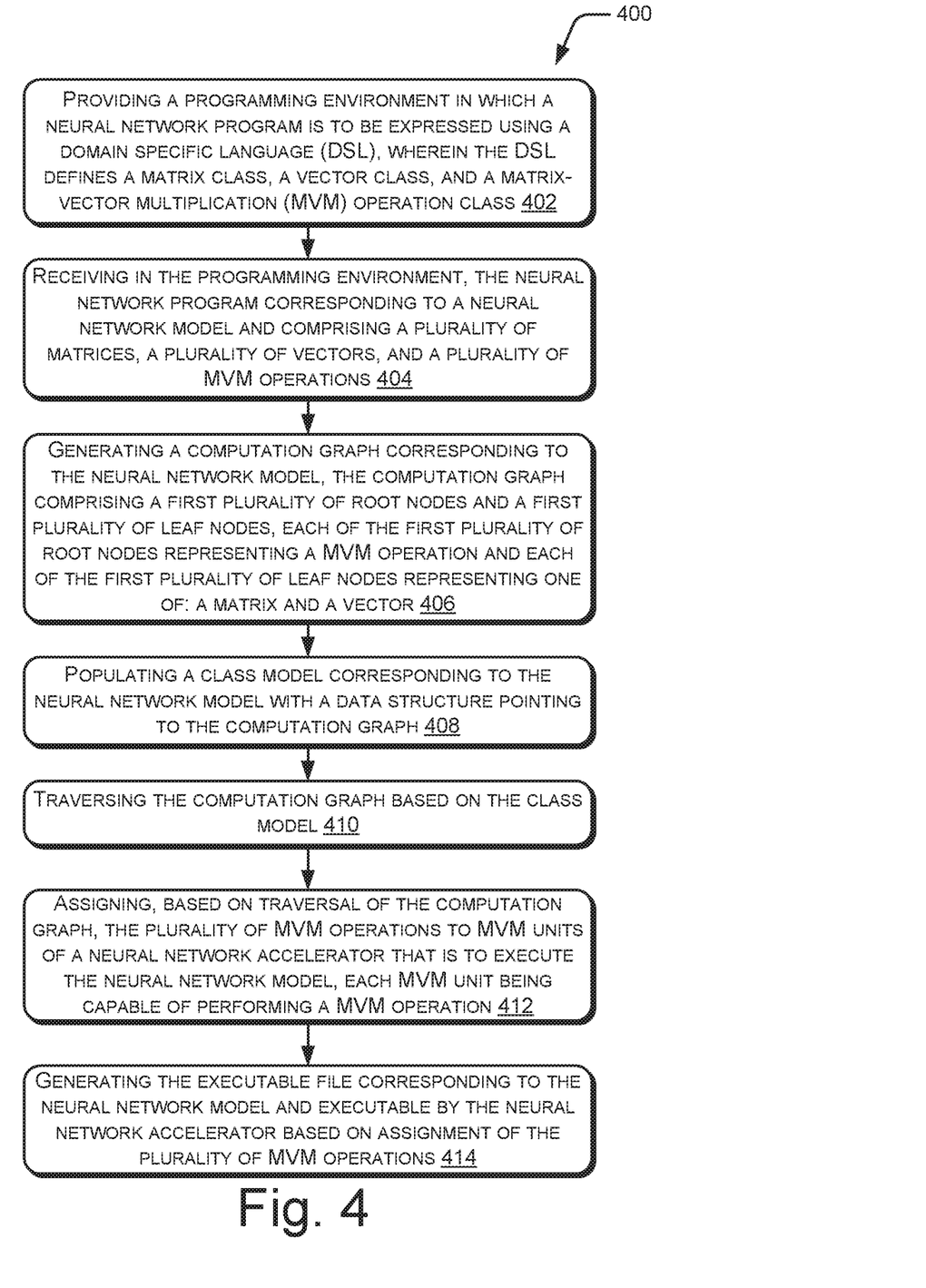
FIG. 4 illustrates a method for generating executable files corresponding to neural network models, according to an example implementation of the present subject matter.

FIG. 4 illustrates a method 400 for generating an executable file corresponding to a neural network model, according to an example implementation of the present subject matter. The method 400 may be performed by the system 100.

The order in which the method 400 is described is not intended to be construed as a limitation, and any number of the described method blocks may be combined in any order to implement the method 400, or an alternative method. Furthermore, the method 400 may be implemented by processing resource(s) or computing device(s) through any suitable hardware, non-transitory machine-readable instructions, or a combination thereof.

It may be understood that steps of the method 400 may be performed by programmed computing devices and may be executed based on instructions stored in a non-transitory computer readable medium. The non-transitory computer readable medium may include, for example, digital memories, magnetic storage media, such as one or more magnetic disks and magnetic tapes, hard drives, or optically readable digital data storage media. Further, although the method 400 may be implemented in a variety of systems, the method 400 is described in relation to the aforementioned system 100, for ease of explanation. In an example, the method 400 may be performed by a processing resource, such as the processor 102.

At block 402, a programming environment is provided in which a neural network program is to be expressed using a domain specific language (DSL). The neural network program may be, for example, the neural network program 204. The DSL defines a matrix class, a vector class, and a matrix-vector multiplication (MVM) operation class, as explained with reference to FIG. 2.

At block 404, the neural network program is received in the programming environment. For example, a developer may develop the neural network program in the programming environment. The neural network program may correspond to a neural network model and may include a plurality of matrices, such as the matrix M, a plurality of vectors, such as the vector X, and a plurality of MVM operations, such as the first MVM operation.

At block 406, a computation graph corresponding to the neural network model is generated in response to an instruction to execute the neural network program. The computation graph may be, for example, the computation graph 202, and includes a first plurality of root nodes and a first plurality of leaf nodes. Each of the first plurality of root nodes represents a MVM operation and each of the first plurality of leaf nodes represents one of a matrix and a vector. The first plurality of root nodes may include, for example, the MVM node 219 and the first plurality of leaf nodes may include, for example, the matrix node 214, the vector node 216, and vector node 218.

At block 408, a class model corresponding to the neural network model is populated with a data structure pointing to the computation graph in response to the instruction to execute the neural network program. The class model may be, for example, the class model 221 and the data structure may be, for example, the first data structure 222 or the second data structure 224. In an example, the class model may include a first plurality of pointers and a second plurality of pointers. Each of the first plurality of pointers points to a location of one of: a matrix and a vector that is represented by a leaf node of the first plurality of leaf nodes. Further, each of the second plurality of pointers points to an operand of a MVM operation that is represented by a root node of the first plurality of root nodes. The first plurality of pointers may be part of the first data structure and the second plurality of pointers may be part of the second data structure.

At block 410, the computation graph is traversed based on the class model. For example, the computation graph may be traversed based on pointers to tensors present in the class model, as explained with reference to FIG. 2.

At block 412, the plurality of MVM operations are assigned to MVM units of a neural network accelerator based on traversal of the computation graph. The neural network accelerator is to execute the neural network model, and may be, for example, the accelerator 226. Each MVM unit is capable of performing a MVM operation, and may be a memristor crossbar, as explained with reference to FIG. 3.

At block 414, an executable file executable by the neural network accelerator is generated based on assignment of the plurality of MVM operations. The executable file corresponds to the neural network model. The steps at blocks 410-414 may be performed in response to an instruction to generate the executable file executable by the neural network accelerator, and may be performed by a compiler corresponding to the neural network accelerator, such as the accelerator compiler explained with reference to FIGS. 2 and 3.

The method 400 may further include execution of the executable file by the neural network accelerator, causing execution of the neural network model. In an example, the computation graph includes a second plurality of root nodes, each of which represents one of: a vector-vector addition (VVA) operation, a matrix-matrix multiplication (MMM) operation, and scalar-scalar addition (SSA) operation in the neural network model. Accordingly, the method may include assigning each VVA operation, MMM operation, and SSA operation to a core of the neural network accelerator. Further, in an example, the neural network model includes a first VVA operation that is related to a first MVM operation of the plurality of MVM operations. For example, the first VVA operation may involve addition of a vector obtained as a result of the first MVM operation with another vector. In such a case, when the first MVM operation is assigned to a first MVM unit of a first core of the neural network accelerator, the method may include assigning the first VVA operation to the first core. This minimizes data movement across cores of the neural network accelerator.

Figure 5:
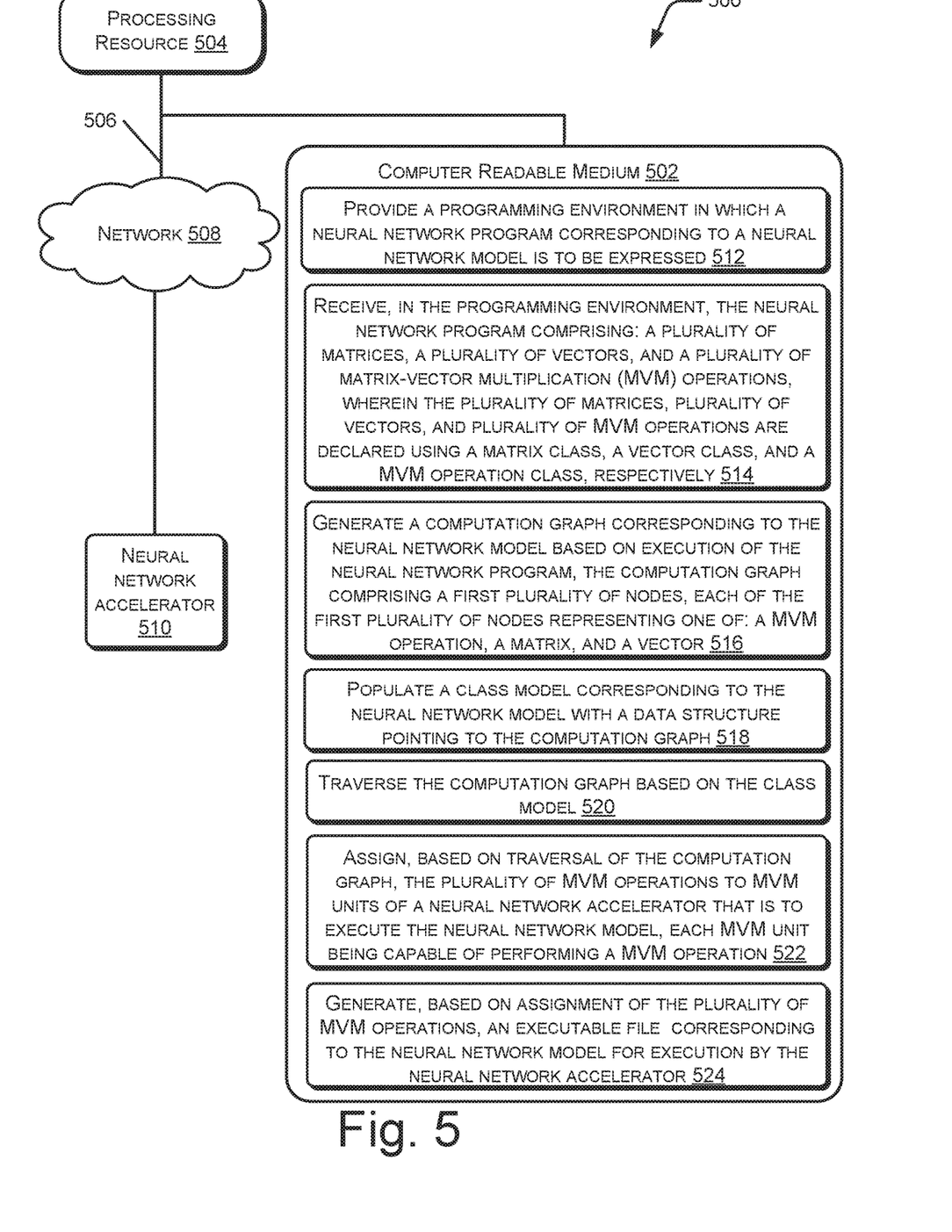
FIG. 5 illustrates a computing environment, implementing a non-transitory computer-readable medium for generation of executable files corresponding to neural network models, according to an example implementation of the present subject matter.

FIG. 5 illustrates a computing environment 500, implementing a non-transitory computer-readable medium 502 for generation of executable files corresponding to neural network models, according to an example implementation of the present subject matter.

In an example, the non-transitory computer-readable medium 502 may be utilized by a system, such as the system 100. The system 100 may be implemented in a public networking environment or a private networking environment. In an example, the computing environment 500 may include a processing resource 504 communicatively coupled to the non-transitory computer-readable medium 502 through a communication link 506.

In an example, the processing resource 504 may be implemented in a system, such as the system 100. The processing resource 504 may be the processor 102. The non-transitory computer-readable medium 502 may be, for example, an internal memory device or an external memory device. In one implementation, the communication link 506 may be a direct communication link, such as any memory read/write interface. In another implementation, the communication link 506 may be an indirect communication link, such as a network interface. In such a case, the processing resource 504 may access the non-transitory computer-readable medium 502 through a network 508. The network 508 may be a single network or a combination of multiple networks and may use a variety of different communication protocols.

The processing resource 504 and the non-transitory computer-readable medium 502 may also be communicatively coupled to a neural network accelerator 510 over the network 508. The neural network accelerator may be, for example, the accelerator 226.

In an example implementation, the non-transitory computer-readable medium 502 includes a set of computer-readable instructions to generate executable files corresponding to neural network models. The set of computer-readable instructions can be accessed by the processing resource 504 through the communication link 506 and subsequently executed to perform acts to detect event storms.

Referring to FIG. 5, in an example, the non-transitory computer-readable medium 502 includes instructions 512 that cause the processing resource 504 to provide a programming environment in which a neural network program corresponding to a neural network model is to be expressed. The neural network program may be, for example, the neural network program 204.

The non-transitory computer-readable medium 502 includes instructions 514 to receive, the neural network program in the programming environment. The neural network program includes a plurality of matrices, a plurality of vectors, and a plurality of matrix-vector multiplication (MVM) operations. The plurality of matrices, plurality of vectors, and plurality of MVM operations are declared using a matrix class, a vector class, and a MVM operation class, respectively.

The non-transitory computer-readable medium 502 includes instructions 516 to generate a computation graph corresponding to the neural network model based on execution of the neural network program. The computation graph may be the computation graph 202 and may include a first plurality of nodes. Each of the first plurality of nodes represents one of: a MVM operation, a matrix, and a vector of the neural network model.

The non-transitory computer-readable medium 502 includes instructions 518 to populate a class model corresponding to the neural network model with a data structure pointing to the computation graph. The class model may be the class model 221 and the data structure may be the first data structure 222 or the second data structure 224.

The non-transitory computer-readable medium 502 includes instructions 520 to traverse the computation graph based on the class model.

The non-transitory computer-readable medium 502 includes instructions 522 to assign, based on traversal of the computation graph, the plurality of MVM operations to MVM units of a neural network accelerator that is to execute the neural network model. Each MVM unit is capable of performing a MVM operation, and may be, for example, the first MVM unit 318 or the second MVM unit 320.

The non-transitory computer-readable medium 502 includes instructions 524 to generate an executable file for execution by the neural network accelerator based on assignment of the plurality of MVM operations. The executable file corresponds to the neural network model.

In an example, subsequent to assignment of MVM operations to the MVM units, to generate the executable file, the non-transitory computer-readable medium 502 includes instructions to convert the computation graph into a sequential stream of instructions and subject the sequential stream of instructions to a code optimization technique. Further, in an example, the neural network model includes a first vector-vector addition (VVA) operation related to a first MVM operation of the plurality of MVM operations and the first MVM operation is assigned to a first MVM unit of a first core of the neural network accelerator. Accordingly, non-transitory computer-readable medium 502 includes instructions to assign the first VVA operation to the first core to prevent data movement from the first core.

The present subject matter enables generating an executable file that is optimized for execution by a neural network accelerator. For instance, since the DSL defines a matrix class, vector class, and MVM operation, the MVM operations that are to be part of the neural network model can be expressed in a simple manner in the neural network program. Further, the MVM operations expressed in the neural network program can be captured as such in the computation graph. Accordingly, the different MVM operations represented in the computation graph may be assigned to different MVM units of the neural network accelerator and such an assignment is captured in the executable file. Therefore, when the executable file is executed by the accelerator, several MVM operations can be executed in parallel. Further, the provision of a class model and population of the class model with a data structure pointing to the computation graph facilitates efficient traversal of the computation graph by the compiler. For instance, repeated traversals of pre-visited nodes of the computation graph are avoided by using the class model. Overall, the present subject matter facilitates efficient and speedy execution of neural network models.

Further, the DSL of the present subject matter may provide several APIs using which the neural network accelerator can be configured using the neural network program. For example, an API can be used to configure a tile of the neural network accelerator as an input tile. Another API can be used to set a pipelining mode.

Although implementations of generating executable files corresponding to neural network models have been described in language specific to structural features and/or methods, it is to be understood that the present subject matter is not necessarily limited to the specific features or methods described. Rather, the specific features and methods are disclosed and explained as example implementations.

We claim:

1. A system comprising:
   a processor;
   a machine-readable storage medium comprising instructions executable by the processor to:
   receive, in a programming environment, a neural network program corresponding to a neural network model, expressed using a domain specific language (DSL), and comprising a plurality of matrices, a plurality of vectors, and a plurality of matrix-vector multiplication (MVM) operations, wherein the plurality of matrices, the plurality of vectors, and the plurality of MVM operations are declared using a matrix class, a vector class, and a MVM operation class, respectively, defined by the DSL;
   generate a computation graph corresponding to the neural network model, the computation graph comprising a first plurality of nodes, each of the first plurality of nodes representing one of a MVM operation, a matrix, and a vector;
   populate a class model corresponding to the neural network model with a data structure pointing to the computation graph;
   traverse the computation graph based on the class model;
   assign, based on traversal of the computation graph, the plurality of MVM operations to MVM units of a neural network accelerator that is to execute the neural network model, each MVM unit being capable of performing a MVM operation; and generate, based on assignment of the plurality of MVM operations, an executable file corresponding to the neural network model for execution by the neural network accelerator;

wherein, to assign a MVM operation to a MVM unit, the instructions are executable by the processor to:
assign a matrix involved in the MVM operation to the MVM unit; and
assign a vector involved in the MVM operation to the MVM unit.

wherein, to assign the matrix to the MVM unit, the instructions are executable by the processor to:
determine whether a size of the matrix is greater than that of the MVM unit;
in response to the size of the matrix being greater than that of the MVM unit, the instructions are executable by the processor to:
divide the matrix into a plurality of sub-matrices; and
assign each sub-matrix to a MVM unit.

2. The system of claim 1, comprising the neural network accelerator, wherein
the neural network accelerator comprises a plurality of tiles,
each tile comprises a plurality of cores,
each core comprises a plurality of MVM units, wherein the plurality of MVM units of each core is part of the MVM units of the neural network accelerator, and
in response to assignment of a MVM operation to one of the MVM units of the neural network accelerator, the MVM unit is to perform the MVM operation.

3. The system of claim 2, wherein each MVM unit is a memristor crossbar.

4. The system of claim 2, wherein each core comprises a vector-vector addition unit, a scalar-scalar addition unit, and a matrix-matrix addition unit to perform a vector-vector addition operation, a scalar-scalar addition operation, and a matrix-matrix addition operation, respectively, of the neural network model.

5. The system of claim 1, wherein, to assign the plurality of MVM operations to MVM units, the instructions are executable by the processor to assign a first MVM operation and second MVM operation that are related to each other to a first MVM unit and a second MVM unit, wherein the first MVM unit and the second MVM unit are present in a single core of the neural network accelerator.

6. The system of claim 1, wherein
the neural network model comprises a first vector-vector addition (VVA) operation,
the first VVA operation involves a vector that is a result of a first MVM operation of the plurality of MVM operations,
the first MVM operation is assigned to a first MVM unit of a first core of the neural network accelerator, and
the instructions are executable by the processor to assign the first VVA operation to a first VVA unit in the first core of the neural network accelerator.

7. The system of claim 1, wherein, subsequent to assignment of the plurality of MVM operations to the MVM units, to generate the executable file, the instructions are executable by the processor to:
convert the computation graph into a sequential stream of instructions; and
subject the sequential stream of instructions to a code optimization technique.

8. The system of claim 1, wherein
the neural network model comprises a plurality of tensors and a plurality of tensor operations,
the plurality of tensors comprises the plurality of matrices, the plurality of vectors, and a plurality of scalars,
the plurality of tensor operations comprises the plurality of MVM operations, VVA operation, matrix-matrix multiplication (MMM) operation, and scalar-scalar addition (SSA) operation, and
the computation graph comprises a second plurality of nodes, each of the second plurality of nodes representing one of: a scalar, a VVA operation, a MMM operation, and a SSA operation.

9. The system of claim 8, wherein the instructions are executable by the processor to at least one of:
deduce whether a tensor among the plurality of tensors is an input tensor or an output tensor based on a pattern of usage of the tensor;
detect tensors that are defined, but left unused in the neural network model; and
detect tensors that are used in the neural network model with an invalid lifetime.

10. A method comprising:
providing, by a processing resource, a programming environment in which a neural network program is to be expressed using a domain specific language (DSL), wherein the DSL defines a matrix class, a vector class, and a matrix-vector multiplication (MVM) operation class;
receiving, by the processing resource, in the programming environment, the neural network program corresponding to a neural network model and comprising a plurality of matrices, a plurality of vectors, and a plurality of MVM operations;
in response to an instruction to execute the neural network program:
generating, by the processing resource, a computation graph corresponding to the neural network model, the computation graph comprising a first plurality of root nodes and a first plurality of leaf nodes, each of the first plurality of root nodes representing a MVM operation and each of the first plurality of leaf nodes representing one of: a matrix and a vector; and
populating, by the processing resource, a class model corresponding to the neural network model with a data structure pointing to the computation graph; and
in response to an instruction to generate an executable file corresponding to the neural network model:
traversing, by the processing resource, the computation graph based on the class model;
assigning, by the processing resource, based on traversal of the computation graph, the plurality of MVM operations to MVM units of a neural network accelerator that is to execute the neural network model, each MVM unit being capable of performing a MVM operation; and
generating, by the processing resource, the executable file executable by the neural network accelerator based on assignment of the plurality of MVM operations,
wherein the class model comprises:
a first plurality of pointers, each of the first plurality of pointers pointing to a location of one of: a matrix and a vector that is represented by a leaf node of the first plurality of leaf nodes; and
a second plurality of pointers, each of the second plurality of pointers pointing to an operand of a MVM operation that is represented by a root node of the first plurality of root nodes.

11. The method of claim 10, comprising execution of the executable file by the neural network accelerator.

12. The method of claim 11, wherein each MVM unit is a memristor crossbar.

13. The method of claim 10, wherein
the computation graph comprises a second plurality of root nodes, each of the second plurality of root nodes representing one of: a vector-vector addition (VVA) operation, a matrix-matrix multiplication (MMM) operation, and scalar-scalar addition (SSA) operation in the neural network model, and
the method comprises assigning each VVA operation, MMM operation, and SSA operation to a core of the neural network accelerator.

14. The method of claim 13, wherein
the neural network model comprises a first VVA operation,
the first VVA operation is related to a first MVM operation of the plurality of MVM operations,
the first MVM operation is assigned to a first MVM unit of a first core of the neural network accelerator, and
the method comprises assigning the first VVA operation to the first core.

* * * * *